(12) United States Patent
Handa et al.

(10) Patent No.: US 6,778,062 B2
(45) Date of Patent: Aug. 17, 2004

(54) ORGANIC PTC THERMISTOR AND MAKING METHOD

(75) Inventors: Tokuhiko Handa, Tokyo (JP); Yukie Yoshinari, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/294,790

(22) Filed: Nov. 15, 2002

(65) Prior Publication Data

US 2003/0091829 A1 May 15, 2003

(30) Foreign Application Priority Data

Nov. 15, 2001 (JP) .......................... 2001-350038

(51) Int. Cl.$^7$ ............................ H01C 7/10; B32B 9/04; B05D 7/00
(52) U.S. Cl. ..................... 338/22 R; 428/221; 428/409; 428/411.1; 427/215; 427/216; 427/220
(58) Field of Search .................. 428/546, 590, 428/221, 409, 411.1; 338/22 R; 427/212, 215, 216, 220

(56) References Cited

U.S. PATENT DOCUMENTS

| 3,243,753 A | 3/1966 | Kohler |
| 3,351,882 A | 11/1967 | Kohler et al. |
| 5,378,407 A | 1/1995 | Chandler et al. |
| 5,945,034 A | 8/1999 | Handa et al. |
| 5,982,271 A | 11/1999 | Handa |
| 6,090,314 A | 7/2000 | Handa et al. |
| 6,143,206 A | 11/2000 | Handa et al. |
| 6,299,801 B1 | 10/2001 | Handa et al. |
| 6,452,476 B1 | 9/2002 | Handa |
| 6,558,579 B2 | 5/2003 | Handa et al. |
| 2003/0076217 A1 * | 4/2003 | Park et al. ............ 338/22 R |

FOREIGN PATENT DOCUMENTS

| JP | 5-47503 | 2/1993 |
| JP | 10-214705 | 8/1998 |
| JP | 11-168005 | 6/1999 |
| JP | 2000-1618 | 1/2000 |
| JP | 2000-82602 | 3/2000 |
| JP | 2000-200704 | 7/2000 |

OTHER PUBLICATIONS

U.S. patent application Ser. No. 09/758,291, filed May 27, 2003.*

* cited by examiner

*Primary Examiner*—Philip Tucker
*Assistant Examiner*—Michael J Feely
(74) *Attorney, Agent, or Firm*—Oblon, Spivak, McClelland, Maier & Neustadt, P.C.

(57) ABSTRACT

In an organic PTC thermistor comprising an organic polymer matrix and conductive metal particles dispersed therein, the conductive metal particles are pretreated with an organic material which is different from the organic polymer matrix, does not covalently bond with the conductive metal particles, and is not compatible at a molecular level with the organic polymer matrix so that an organic material layer covers surfaces of conductive metal particles whereby the stability of thermistor performance is improved.

15 Claims, 3 Drawing Sheets

ORGANIC PTC THERMISTOR AND MAKING METHOD

BACKGROUND OF THE INVENTION

1. Field of the Invention

This invention relates to an organic positive temperature coefficient thermistor that is used as a temperature sensor or overcurrent-protecting element, and has positive temperature coefficient (PTC) of resistivity characteristics that its resistance value increases with increasing temperature.

2. Background Art

An organic positive temperature coefficient thermistor having conductive particles dispersed in a polymer matrix is well known in the art, as disclosed in U.S. Pat. Nos. 3,243,753 and 3,351,882.

The increase in the resistance value is believed to be due to the expansion of the crystalline polymer upon melting, which in turn cleaves a current-carrying path formed by the conductive fine particles.

An organic PTC thermistor can be used as an overcurrent or overheat-protecting element, a self-regulating heater, and a temperature sensor.

Of these, the overcurrent or overheat-protecting element in series connection with an electric circuit requires a sufficiently low resistance value at room temperature in a non-operating state, a sufficiently high rate of change between the room-temperature resistance value and the resistance value in operation, and a minimal change of resistance upon repetitive operation. Conductive particles used in organic PTC thermistors are typically carbonaceous conductive particles such as carbon black and graphite. In order to reduce the resistance of the thermistor, however, a large amount of conductive particles must be blended at the expense of rate of resistance change, failing to provide satisfactory characteristics for protecting overcurrent or overheating.

This drawback can be overcome using conductive metal particles having a lower resistivity than carbonaceous particles. To find a compromise between a low room-temperature resistance and a high resistance change rate, the use of conductive metal particles having spiky protuberances has been proposed. JP-A 5-47503 discloses an organic PTC thermistor comprising, in kneaded admixture, a crystalline polymer and conductive particles having spiky protuberances. U.S. Pat. No. 5,378,407 discloses a conductive polymer composition comprising a crystalline polyolefin, olefin copolymer or fluoropolymer and Ni filaments having spiky protuberances.

Likewise, the inventors proposed in JP-A 10-214705, JP-A 11-168005, JP-A 2000-82602, and JP-A 2000-200704, the use of conductive particles having spiky protuberances to provide both a low room-temperature resistance and a high resistance change rate.

However, the inventors found that these organic PTC thermistors using conductive metal particles lack reliability in terms of long-term storage or the like. In a storage test, the room-temperature resistance gradually increased with the passage of time to an extent which was dependent on storage test conditions.

The reasons are that conductive metal particles are oxidized on their surface to reduce their conductivity, that during storage, more conductive particles agglomerate to break some conductive paths, and the like. It has been found that the problem of resistance increase can be solved by pretreating surfaces of conductive metal particles with an organic material.

SUMMARY OF THE INVENTION

An object of the invention is to improve the performance stability of an organic PTC thermistor using conductive metal particles.

The above and other objects are achieved by the present invention which is defined below.

(1) An organic positive temperature coefficient thermistor comprising, an organic polymer matrix and conductive metal particles dispersed therein, wherein the conductive metal particles have a layer of organic material disposed thereon, and wherein the organic material is different from the organic polymer matrix, does not covalently bond with the conductive metal particles, and is not compatible at a molecular level with the organic polymer matrix.

(2) The organic positive temperature coefficient thermistor of (1), wherein said organic material is not reactive with the organic polymer matrix.

(3) The organic positive temperature coefficient thermistor of (1) or (2), wherein said conductive metal particles comprise nickel or copper.

(4) The organic positive temperature coefficient thermistor of any one of (1) to (3), wherein said organic polymer matrix comprises a thermoplastic polymer.

(5) The organic positive temperature coefficient thermistor of any one of (1) to (4), further comprising a low-molecular weight organic compound.

(6) The organic positive temperature coefficient thermistor of any one of (1) to (5), wherein said conductive metal particles have spiky protuberances.

(7) The organic positive temperature coefficient thermistor of any one of (1) to (6), wherein said organic material is biodegradable.

(8) A method for preparing an organic positive temperature coefficient thermistor, comprising the steps of pretreating conductive metal particles with an organic material so that the organic material covers surfaces of the conductive metal particles, and mixing the treated conductive metal particles with an organic polymer matrix for dispersion.

(9) The method of (8), wherein said organic material is different from the organic polymer matrix, does not covalently bond with the conductive metal particles, and is not compatible at a molecular level with the organic polymer matrix.

(10) The method of (8) or (9), wherein said organic material is not reactive with the organic polymer matrix.

(11) The method of any one of (8) to (10), wherein said conductive metal particles comprise nickel or copper.

(12) The method of any one of (8) to (11), wherein said organic polymer matrix comprises a thermoplastic polymer.

(13) The method of any one of (8) to (12), wherein said organic polymer matrix further comprises a low-molecular weight organic compound.

(14) The method of any one of (8) to (13), wherein said conductive metal particles have spiky protuberances.

(15) The method of any one of (8) to (14), wherein said organic material is biodegradable.

The organic PTC thermistor of the invention is characterized in that conductive metal particles pretreated on surfaces with an organic material are dispersed in an organic polymer matrix.

The pretreatment of conductive metal particle surfaces with an organic material prevents diffusion of oxygen into particle surfaces and hence, oxidation of particles during long-term storage, thereby stabilizing the resistance value. The surface treatment is also believed effective for preventing excessive agglomeration of conductive metal particles. Additionally, the surface treatment permits the conductive metal particles to be readily separated from the organic polymer matrix.

DESCRIPTION OF THE PREFERRED EMBODIMENTS

Figure 1:
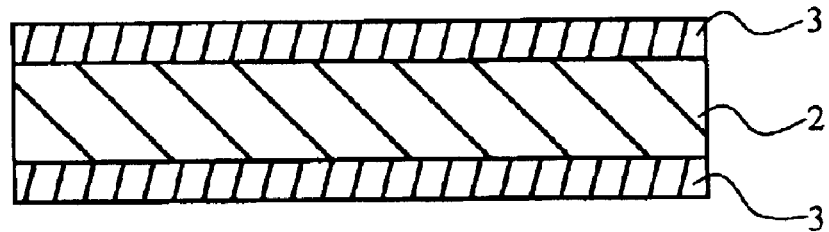
FIG. 1 is a cross-sectional view of an organic PTC thermistor according to one embodiment of the invention.

The organic PTC thermistor of the invention is characterized in that in an organic polymer matrix are dispersed conductive metal particles which have been surface pretreated with an organic material that is different from the organic polymer matrix, does not covalently bond with the conductive metal particles, and is not compatible at a molecular level with the organic polymer matrix.

The organic polymer matrix may be either thermoplastic or thermosetting.

Suitable thermoplastic polymer matrices include polyolefins (e.g., polyethylene), olefin polymers (e.g., ethylene-vinyl acetate copolymers, ethylene-acrylic acid copolymers), halogenated polymers, polyamides, polystyrene, polyacrylonitrile, polyethylene oxide, polyacetal, thermoplastic modified celluloses, polysulfones, thermoplastic polyesters (e.g., PET), poly(ethyl acrylate), poly(methyl methacrylate) and thermoplastic elestomers.

Illustrative examples include high-density polyethylene (e.g., trade name HI-ZEX 2100JP from Mitsui Chemicals, Inc., Marlex 6003 by Philips, and HY540 by Japan Polychem Corp.), low-density polyethylene (e.g., trade name LC500 by Japan Polychem Corp. and DYNH-1 by Union Carbide), medium-density polyethylene (e.g., trade name 2604M by Gulf), ethylene-ethyl acrylate copolymers (e.g., trade name DPD6169 by Union Carbide), ethylene-vinyl acetate copolymers (e.g., trade name LV241 by Japan Polychem Corp.), ethylene-acrylic acid copolymers (e.g., trade name EAA455 by Dow Chemical), ionomer resins (e.g., trade name Himilan 1555 by Dupont-Mitsui Polychemicals Co., Ltd.), poly(vinylidene fluoride) (e.g., trade name Kynar 461 by Elf Atochem), and vinylidene fluoride-tetrafluoroethylene-hexafluoropropylene copolymers (e.g., trade name Kynar ADS by Elf Atochem).

Of these, polyolefins are preferred, with polyethylene being especially preferred. High-density, linear low-density and low-density polyethylenes of various grades are useful, with the high-density and linear low-density polyethylenes being preferred. A melt viscosity (MFR) of up to 15.0 g/10 min, especially up to 8.0 g/10 min is preferred.

Suitable thermosetting polymer matrices include, but are not limited to, epoxy resins, unsaturated polyester resins, polyimide, polyurethane, phenolic resins, and silicone resins.

Epoxy resins are oligomers having reactive epoxy end groups (with a molecular weight of several hundred to several ten thousand) cured or crosslinked with various curing agents, and are generally divided into glycidyl ether type (as typified by bisphenol A), glycidyl ester type, glycidyl amine type and alicyclic type. In certain applications, trifunctional or multi-functional epoxy resins may be used. Of these, epoxy resins of the glycidyl ether type, especially bisphenol A type are preferably used in the practice of the invention. The epoxy resins used should preferably have an epoxy equivalent of about 100 to about 500. The curing agents are divided into addition polymerization, catalyst and condensation types, depending on the reaction mechanism. Curing agents of the addition polymerization type themselves add on epoxy or hydroxyl groups, and include polyamines, acid anhydrides, polyphenols, polymercaptans and isocyanates. Catalyst type curing agents are to catalyze polymerization between epoxy groups and include tertiary amines and imidazoles. Curing agents of the condensation type achieve curing through condensation with hydroxyl groups and include phenolic resins and melamine resins. In the practice of the invention, curing agents of the addition polymerization type, especially polyamines and acid anhydrides are preferred curing agents for bisphenol A type epoxy resins. Curing conditions may be determined appropriately.

The foregoing epoxy resins and curing agents are commercially available, for example, under the trade name of Epikote (resin), Epicure and Epomate (curing agent) from Shell-Yuka Epoxy Co., Ltd. and Araldite from Ciba Geigy.

Unsaturated polyester resins are polyesters composed mainly of an unsaturated dibasic acid or dibasic acid with a polyhydric alcohol (having a molecular weight of about 1,000 to about 5,000), dissolved in a vinyl monomer serving for crosslinking, which are cured using as a polymerization initiator an organic peroxide such as benzoyl peroxide. For curing, a polymerization accelerator may be optionally used in combination. With respect to the starting reactants to the unsaturated polyesters, preferred unsaturated dibasic acids include maleic anhydride and fumaric acid; preferred dibasic acids include phthalic anhydride, isophthalic acid, and terephthalic acid; and preferred polyhydric alcohols include propylene glycol and ethylene glycol. Suitable vinyl monomers include styrene, diallyl phthalate, and vinyl toluene. The amount of vinyl monomer used may be determined as appropriate, and typically about 1.0 to 3.0 mol per mol of fumaric acid residue. For preventing gelation during the synthesis process and adjusting cure, any of well-known polymerization inhibitors such as quinones and hydroquinones may be added. Curing conditions may be determined appropriately.

The foregoing unsaturated polyester resins are commercially available, for example, under the trade name of Epolac from Nippon Shokubai Co., Ltd., Polyset from Hitachi Chemical Co., Ltd., and Polylite from Dainippon Ink & Chemicals, Inc.

Polyimide resins are generally divided into condensation and addition types depending on their preparation process. Preferred polyimides of the addition polymerization type are bismaleimide type polyimides, which can be cured by homo-polymerization, reaction with other unsaturated bonds, Michael addition reaction with aromatic amines, or Diels-Alder reaction with dienes. Preferred in the practice of the invention are bismaleimide type polyimide resins resulting from addition reaction of bismaleimides with aromatic diamines. A suitable aromatic diamine is diaminodiphenylmethane. Synthesis and curing conditions may be determined appropriately.

Such polyimides are commercially available, for example, under the trade name of Imidalloy from Toshiba Chemical Co., Ltd. and Kerimide from Ciba Geigy.

Polyurethane is obtained by addition polymerization reaction of polyisocyanate with polyol. Suitable polyisocyanates include aromatic and aliphatic ones, preferably aromatic ones, for example, 2,4- or 2,6-tolylene diisocyanate, diphenylmethane diisocyanate and naphthalene diisocyanate. Suitable polyols include polyether polyols such as polypropylene glycol, polyester polyols and acrylic polyols, with polypropylene glycol being preferred. Catalysts may be amines including tertiary amines (e.g., triethylene diamine) and amine salts, and preferably organometallic catalysts such as dibutyltin dilaurate and stannous octoate. Additionally, crosslinking agents such as polyhydric alcohols and polyfunctional amines may be used as adjuvant. Synthesis and curing conditions may be determined appropriately.

Such polyurethanes are commercially available, for example, under the trade name of Sumidure from Bayer-Sumitomo Urethane Co., Ltd., NP series from Mitsui-Toatsu Chemical Co., Ltd., and Colonate from Nippon Polyurethane Industry Co., Ltd.

Phenolic resins are obtained by reacting phenols with aldehydes such as formaldehyde and generally divided into novolac and resol types depending on the synthesis conditions. Novolac type phenolic resins produced in the presence of acidic catalysts are cured by heating along with a crosslinking agent such as hexamethylene tetramine. Resol type phenolic resins produced in the presence of basic catalysts are cured by heating alone or in the presence of acidic catalysts. Either of novolac and resol types may be used herein. Synthesis and curing conditions may be determined appropriately.

These phenolic resins are commercially available, for example, under the trade name of Sumicon from Sumitomo Bakelite Co., Ltd., Standlite from Hitachi Chemical Co., Ltd. and Tecolite from Toshiba Chemical Co., Ltd.

Silicone resins include silicone resins comprising recurring siloxane bonds and primarily produced by hydrolysis or polycondensation of organohalosilanes; modified silicone resins such as alkyd-, polyester-, acrylic-, epoxy-, phenol-, urethane- and melamine-modified silicone resins; silicone rubbers obtained by crosslinking linear polydimethylsiloxane or copolymers thereof with organic peroxides or the like; and room-temperature vulcanizable (RTV) silicone rubbers of the condensation or addition type.

These silicone resins are commercially available. Various silicone rubbers and silicone resins manufactured by Shin-Etsu Chemical Co., Ltd., Dow Corning-Toray Co., Ltd., and Toshiba Silicone Co., Ltd. are useful.

Any suitable thermosetting resin may be selected depending on the desired properties and application. Among others, epoxy resins and unsaturated polyester resins are preferred. Also useful are polymeric products obtained by reacting two or more of the foregoing.

When used in combination, a thermosetting polymer matrix and a thermoplastic polymer matrix are preferably mixed in a weight ratio of from 1:5 to 9:1, especially from 1:4 to 8:1. Outside the range, a higher proportion of the thermoplastic polymer matrix tends to diminish the stability of initial resistance whereas a lower proportion tends to degrade the stability under hot humid conditions.

A low-molecular weight organic compound may be additionally used in the matrix. Normal organic PTC thermistors operate (i.e., increase their resistance) by way of expansion of the organic polymer matrix. The use of low-molecular weight organic compound in the active material has the advantage that due to a higher degree of crystallization than polymers, the resistance increases at a higher rate as temperature rises. Use of low-molecular weight organic compounds having different melting points enables easy control of the temperature (operating temperature) at which resistance increases. Although polymers, which are likely to take a supercooled state, exhibit a hysteresis phenomenon that than the temperature at which the original resistance is resumed upon cooling is lower than the operating temperature upon heating, the use of low-molecular weight organic compound alleviates the hysteresis. In the case of crystalline polymers, their melting point and hence, the operating temperature can be changed by altering their molecular weight or degree of crystallization or by copolymerizing with comonomers, but with a concomitant change of crystalline state which can lead to unsatisfactory PTC characteristics. This problem becomes more outstanding when the operating temperature is set at 100° C. or lower.

The low-molecular weight organic compound used herein is not critical as long as it is a crystalline substance having a molecular weight of less than about 2,000, preferably less than about 1,000, and more preferably about 200 to 800. Preferably it is solid at room temperature (about 25° C.).

Suitable low-molecular weight organic compounds include waxes (for example, petroleum waxes such as paraffin wax and microcrystalline wax, and natural waxes such as vegetable waxes, animal waxes and mineral waxes), and oils and fats (for example, those known as fat or solid fat). Waxes, oils and fats contain such components as hydrocarbons (e.g., alkane series straight-chain hydrocarbons having 22 or more carbon atoms), fatty acids (e.g., fatty acids of alkane series straight-chain hydrocarbons having 12 or more carbon atoms), fatty esters (e.g., methyl esters of saturated fatty acids obtained from saturated fatty acids having 20 or more carbon atoms and lower alcohols such as methyl alcohol), fatty acid amides (e.g., unsaturated fatty acid amides such as oleic acid amide and erucic acid amide), aliphatic amines (e.g., aliphatic primary amines having 16 or more carbon atoms), higher alcohols (e.g., n-alkyl alcohols having 16 or more carbon atoms), and chlorinated paraffin. These compounds may be used alone or in admixture as the low-molecular weight organic compound. The low-molecular weight organic compound may be selected as appropriate to help disperse the other ingredients in the polymer matrix while taking into account the polarity of the polymer matrix. The preferred low-molecular weight organic compounds are petroleum waxes.

These low-molecular weight organic compounds are commercially available, and commercial products may be used without further treatment.

The low-molecular weight organic compound used herein should preferably have a melting point (mp) of 40 to 200° C., more preferably 40 to 100° C. Such low-molecular weight organic compounds, for instance, include paraffin waxes such as tetracosane $C_{24}H_{50}$ (mp 49–52° C.), hexatriacontane $C_{36}H_{74}$ (mp 73° C.) under the trade name HNP-10 (mp 75° C.) and HNP-3 (mp 66° C.) from Nippon Seiro Co., Ltd.; microcrystalline waxes such as Hi-Mic 1080 (mp 83° C.), Hi-Mic 1045 (mp 70° C.), Hi-Mic 2045 (mp 64° C.) and Hi-Mic 3090 (mp 89° C.), all from Nippon Seiro Co., Ltd., Celata 104 (mp 96° C.) and 155 Micro-Wax (mp 70° C.), both from Nippon Petroleum Refining Co., Ltd.; fatty acids such as behenic acid (mp 81° C.), stearic acid (mp 72° C.) and palmitic acid (mp 64° C.), all from Nippon Seika Co., Ltd.; fatty acid esters such as methyl arachidate (mp 48° C.)

from Tokyo Kasei Co., Ltd.; and fatty acid amides, for example, oleic acid amide (mp 76° C.) from Nippon Seika Co., Ltd. Also included are polyethylene waxes such as Mitsui Hiwax 110 (mp 100° C.) from Mitsui Chemical Co., Ltd.; stearic acid amide (mp 109° C.), behenic acid amide (mp 111° C.), N,N'-ethylene-bislauric acid amide (mp 157° C.), N,N'-dioleyladipic acid amide (mp 119° C.), and N,N'-hexamethylenebis-12-hydroxystearic acid amide (mp 140° C.). Use may also be made of wax blends of a paraffin wax with a resin and such wax blends having microcrystalline wax further blended therein so as to give a melting point of 40° C. to 200° C.

The low-molecular weight organic compounds may be used alone or in combination of two or more, depending on the operating temperature and other factors.

An appropriate amount of the low-molecular weight organic compound is 0.05 to 4 times, preferably 0.1 to 2.5 times the total weight of the polymer matrix (inclusive of the curing agent and other additives). If this mixing proportion becomes lower or the content of the low-molecular weight organic compound becomes low, it may fail to provide a satisfactory resistance change rate. Inversely, if this mixing proportion becomes higher or the content of the low-molecular weight organic compound becomes high, the thermistor body can be substantially deformed upon melting of the low-molecular weight organic compound and it may become awkward to mix with conductive metal particles.

When analyzed by differential scanning calorimetry (DSC), the organic PTC thermistor of the invention develops endothermic peaks near the melting points of the polymer matrix and the low-molecular weight organic compound. This suggests an island-in-the-sea structure that the polymer matrix and the low-molecular weight organic compound are independently dispersed.

The conductive metal particles used herein are formed of copper, aluminum, nickel, tungsten, molybdenum, silver, zinc, cobalt, etc., with nickel and copper being preferred.

The shape of particles may be spherical, flake, rod or the like. Particles having spiky protuberances on their surface are especially preferred. Presumably such a protuberant surface contour allows for conduction of tunneling current flow and can reduce the room-temperature resistance as compared with smooth spherical conductive metal particles. The space between protuberant conductive metal particles is larger than the space between smooth spherical conductive metal particles, contributing to a greater resistance change rate.

The conductive metal particles having spiky protuberances as used herein are made up of primary particles each having pointed protuberances. More specifically, one particle bears a plurality of, usually 10 to 500, conical and spiky protuberances having a height of $\frac{1}{3}$ to $\frac{1}{50}$ of the particle diameter. The conductive particles are made of a metal, typically nickel.

Although the conductive metal particles may be used in a powder form consisting of discrete particles, it is preferable that about 10 to 1,000 primary particles be interconnected in chain-like network to form a secondary particle. The chain form of particles does not exclude the partial presence of discrete primary particles. Examples of the former include a powder of spherical nickel particles having spiky protuberances, which is commercially available under the trade name of INCO Type 123 Nickel Powder (INCO Ltd.). The powder preferably has an average particle diameter of about 3 to 7 $\mu$m, an apparent density of about 1.8 to 2.7 g/cm$^3$, and a specific surface area of about 0.34 to 0.44 m$^2$/g.

Preferred examples of the chain-like network nickel powder are filamentary nickel powders, which are commercially available under the trade name of INCO Type 210, 255, 270 and 287 Nickel Powders from INCO Ltd. Of these, INCO Type 210 and 255 Nickel Powders are preferred. The primary particles therein preferably have an average particle diameter of preferably at least 0.1 $\mu$m, and more preferably from about 0.2 to about 4.0 $\mu$m. Most preferred are primary particles having an average particle diameter of 0.4 to 3.0 $\mu$m, in which may be mixed up to 50% by weight of primary particles having an average particle diameter of 0.1 $\mu$m to less than 0.4 $\mu$m. The apparent density is about 0.3 to 1.0 g/cm$^3$ and the specific surface area is about 0.4 to 2.5 m$^2$/g.

It is to be noted that the average particle diameter is measured by the Fischer sub-sieve method.

Such conductive metal particles are set forth in JP-A 5-47503 and U.S. Pat. No. 5,378,407, which are incorporated herein by reference.

Besides the conductive metal particles having spiky protuberances, auxiliary conductive particles may be added for imparting additional electric conductivity. Examples include carbonaceous conductive particles such as carbon black, graphite, carbon fibers, metallized carbon black, graphitized carbon black and metallized carbon fibers, spherical, flaky or fibrous metal particles, metal particles coated with a different metal (e.g., silver-coated nickel particles), and ceramic conductive particles such as tungsten carbide, titanium nitride, zirconium nitride, titanium carbide, titanium boride and molybdenum silicide, as well as conductive potassium titanate whiskers as disclosed in JP-A 8-31554 and JP-A 9-27383. The amount of auxiliary conductive particles should preferably be up to 25% by weight based on the weight of the conductive metal particles having spiky protuberances.

The amount of the conductive metal particles should preferably be 1.5 to 8 times as large as the total weight of the polymer matrix and low-molecular organic compound (the total weight of organic components inclusive of curing agent and other additives). If this mixing ratio becomes low or the amount of the conductive metal particles becomes small, it may be difficult to make the room-temperature resistance in a non-operating state sufficiently low. If the amount of the conductive metal particles becomes large, on the contrary, it may become difficult to obtain a high rate of resistance change and to achieve uniform mixing, failing to provide stable properties.

The organic material used for surface treatment according to the invention may be of any type as long as it is liquid or solid at room temperature and non-volatile at room temperature as demonstrated by a vapor pressure of less than about 0.1 mmHg at room temperature. A choice of organic material is desirable for affinity to surfaces of conductive metal particles. On the other hand, the use of coupling agents which will firmly bond to metal surfaces should be avoided because they interfere with the conductivity of metal particles.

For the purpose of distributing the organic material on surfaces of conductive metal particles in a kneaded mixture, desirable results are obtained with the organic material which is not so compatible with the organic polymer matrix. The term "not so compatible" as used herein means that those materials compatible at a molecular level with the organic polymer matrix are excluded, while those materials undergoing microscopic or macroscopic phase separation are preferably used.

Those materials which are active to the matrix resin should also be excluded. If an organic material can bond or interact with the matrix resin, it restrains the behavior of conductive metal particles, adversely affecting the restoring property from the operating state. Such undesirable materials are, for example, organic acids and triazine derivatives. When a polyolefin is used as the matrix resin, organic acids, especially long-chain saturated or unsaturated fatty acids are undesirable because carboxyl groups can adsorb to surfaces of the conductive metal particles and long-chain hydrocarbon moieties can interact with the matrix resin. Also, triazine derivatives can adsorb to surfaces of the conductive metal particles and various functional groups thereon can react or interact with the matrix resin.

Useful organic materials are, for example, polyhydric alcohols which are commonly used as a softener or humectant. Examples include ethylene glycol, polyethylene glycol, propylene glycol, dipropylene glycol, 1,3-butylene glycol, isoprene glycol, erythrithol, diethylene glycol, pentyl glycol, neopentyl glycol, polypropylene glycol, polyoxyethylene-polyoxypropylene copolymers, glycerin, diglycerin, polyglycerin, polyoxyethylene glycerin, and polytetramethylene ether glycol.

Also useful are long-chain alcohols, preferably those having at least 8 carbon atoms. Suitable long-chain alcohols include octanol, tetradecanol, undecanol, stearyl alcohol, 2-decanol, decanol, 2-dodecanol, 1,2-dodecane diol, tridecanol, hexadecanol, 1,12-dodecane diol, 1,2-decane diol, 1,10-decane diol, 4-decanol, 2-octanol, 3-octanol, nonanol, 2-undecanol, 2-tetradecanol, 1,2-tetradecane diol, 1,14-tetradecane diol and heptadecanol.

Esters of the foregoing alcohols with fatty acids are useful. Ethers such as polyoxyethylene lauryl ether and polyoxyethylene butyl ether are also useful.

Also preferred are aliphatic carboxylic acid amides, for example, oleic acid amide, stearic acid amide, erucic acid amide, behenic acid amide, N-oleylpalmitic acid amide, N-stearylerucic acid amide, N,N'-ethylenebis(stearamide), N,N'-methylenebis(stearamide), methylol-stearamide, ethylene bisoleic acid amide, ethylene bisbehenic acid amide, ethylene bisstearic acid amide, ethylene bislauric acid amide, hexamethylene bisoleic acid amide, hexamethylene bisstearic acid amide, butylene bisstearic acid amide, N,N'-dioleylsebacic acid amide, N,N'-dioleyladipic acid amide, N,N'-distearyladipic acid amide, N,N'-distearylsebacic acid amide, m-xylylene bisstearic acid amide, N,N'-distearylisophthalic acid amide, N,N'-distearylterephthalic acid amide, N-oleyloleic acid amide, N-stearyloleic acid amide, N-stearylerucic acid amide, N-oleylstearic acid amide, N-stearylstearic acid amide, N-butyl-N'-stearylurea, N-propyl-N'-stearylurea, N-allyl-N'-stearylurea, N-phenyl-N'-stearylurea, N-stearyl-N'-stearylurea, dimesitol oil amide, dimethyllauric acid amide, and dimethylstearic acid amide. Of these, oleic acid amide, stearic acid amide, erucic acid amide, behenic acid amide, N-oleylpalmitic acid amide and N-stearylerucic acid amide are preferred.

Many of the foregoing are biodegradable. Biodegradability becomes advantageous in the recycle process of PTC thermistors in that the organic layer enclosing metal particles are biodegraded off so that the matrix resin and metal particles can be separated relatively easily.

More particularly, the resin matrix containing the metal powder is crushed or comminuted and treated in a batch layer containing microorganisms and enzymes whereby the organic layer disposed around metal particles is degraded, releasing the metal particles from the resin matrix. Thereafter, the metal particles can be separated from the resin matrix by utilizing a specific gravity difference or the like.

Conventional biological treatments used for degrading the organic layer include microbial floatation suspension processes using activated sludge, anaerobic digestion, and sponge carrier, and biological membrane processes using biological filtration, immersion filter bed, fluidized bed, rotating disk and water-spraying filter bed, and self-granulation processes. These treatments may be either continuous or batchwise, and either anaerobic or aerobic, or a combination thereof. The activated sludge treatment is disclosed in JP-B 55-49559 and JP-B 51-12943. Enzymes may be used instead of or in combination with microorganisms.

Besides the above mentioned materials, phenolic compounds and hydrophilic polymers may be used.

Examples include p-phenolsulfonic acid, 2,6-dibutyl-p-cresol, 2,2'-methylenebis(4-methyl-6-t-butylphenol) and 4,4'-butylidenebis(3-methyl-6-t-butylphenyl), as well as polyvinyl alcohol, polyvinyl pyrrolidone, polyacrylamide, polyacrylic acid and salts thereof, and polyvinyl methyl ether.

Any desired method may be employed for treating conductive metal particles with the organic material. One exemplary method is by dissolving the organic material in a solvent to form a solution, dispersing conductive metal particles in the solution, and evaporating off the solvent. Alternatively, the solution is applied to conductive metal particles as by spraying, and the solvent is evaporated off.

The solvents used herein include water, ethanol, methanol, acetone, toluene, and hexane.

The amount of the organic material used to cover conductive metal particles may be determined in accordance with the specific surface area and specific gravity of conductive metal particles and the size and molecular weight of an organic material molecule, and is typically in a range of 0.1% to 5% by weight based on the weight of conductive metal particles. Too small an amount of the organic material may fail to achieve the desired property improving effect whereas too large an amount may make it difficult to fully diminish the resistance of the thermistor.

Described below is the method for preparing an organic PTC thermistor according to the invention.

Any well-known technique may be used in kneading a thermoplastic polymer matrix and a low-molecular weight organic compound with conductive metal particles. Using any well-known mill or roll, kneading may be carried out at a temperature higher than the melting point of the polymer having the highest melting point among the starting components, preferably higher by 5 to 40° C., and for a period of about 5 to 90 minutes. To prevent thermal degradation, kneading is desirably carried out at a temperature which is higher than the melting point of the polymer, but as low as possible to knead. Alternatively, the polymer matrix and the low-molecular weight organic compound are previously melt mixed or dissolved in a solvent and mixed.

When a solution technique is used to mix the polymer matrix, low-molecular weight organic compound and conductive metal particles, a solvent in which at least one of the polymer matrix and the low-molecular weight organic compound is dissolvable is used, and the remainder of the polymer matrix and the low-molecular weight organic compound, and the conductive metal particles are then dispersed in the solution.

The kneaded mixture is press molded into a sheet having a predetermined thickness. Molding may also be carried out by casting or extrusion. An extrusion molding technique of carrying out kneading and sheeting in one step is also employable. After molding, crosslinking treatment may be conducted if desired. Suitable crosslinking techniques include radiation crosslinking, chemical crosslinking with organic peroxides, water crosslinking by grafting silane coupling agents and effecting condensation reaction of silanol groups, with the radiation crosslinking being preferred. Finally, a metal electrode of Cu, Ni, etc. is heat pressed or a conductive paste is applied, completing a thermistor device. It is also possible to carry out press molding and electrode formation at the same time.

When a thermosetting polymer matrix is used, a predetermined amount of uncured thermosetting resin and conductive metal particles are mixed and dispersed to form a coating solution. Mixing and dispersion may be carried out in a well-known manner. There may be employed a variety of agitators, dispersing machines and paint roll mills. If air is introduced during the mixing step, the mixture is vacuum deaerated. Various solvents such as aromatic hydrocarbons, ketones, and alcohols may be used for viscosity adjustment. The dispersion is then cast between metal foil electrodes of nickel or copper. Alternatively, the dispersion is processed into a sheet by a suitable application technique such as screen printing, and the sheet is cured under heat treatment conditions known to the thermosetting resin. It is acceptable to carry out pre-curing at a relatively low temperature, followed by curing at elevated temperature. In a further procedure, only the mixture is cured into a sheet to which a conductive paste is applied to form an electrode. The resulting sheet laminate is punched into a desired shape, obtaining a thermistor device.

To prevent thermal degradation of the polymer matrix and low-molecular weight organic compound, an antioxidant may also be incorporated. Typically phenols, organic sulfurs, and phosphites are used as the antioxidant.

Additionally, there may be added a good thermal conductive additive, for example, silicon nitride, silica, alumina and clay (mica, talc, etc.) as described in JP-A 57-12061, silicon, silicon carbide, silicon nitride, beryllia and selenium as described in JP-B 7-77161, inorganic nitrides and magnesium oxide as described in JP-A 5-217711.

For durability improvements, there may be added titanium oxide, iron oxide, zinc oxide, silica, magnesium oxide, alumina, chromium oxide, barium sulfate, calcium carbonate, calcium hydroxide and lead oxide as described in JP-A 5-226112, and inorganic solids having a high relative permittivity such as barium titanate, strontium titanate and potassium niobate as described in JP-A 6-68963.

For withstand voltage improvements, boron carbide and analogues as described in JP-A 4-74383 may be added.

For strength improvements, there may be added hydrated alkali titanates as described in JP-A 5-74603, and titanium oxide, iron oxide, zinc oxide and silica as described in JP-A 8-17563.

There may be added a crystal nucleator, for example, alkali halides and melamine resin as described in JP-B 59-10553, benzoic acid, dibenzylidenesorbitol and metal benzoates as described in JP-A 6-76511, talc, zeolite and dibenzylidenesorbitol as described in JP-A 7-6864, and sorbitol derivatives (gelling agents), asphalt and sodium bis(4-t-butylphenyl) phosphate as described in JP-A 7-263127.

As an arc-controlling agent, there may be added alumina and magnesia hydrate as described in JP-B 4-28744, metal hydrates and silicon carbide as described in JP-A 61-250058.

For preventing the harmful effects of metals, there may be added Irganox MD1024 (Ciba-Geigy) as described in JP-A 7-6864, etc.

As a flame retardant, there may be added diantimony trioxide and aluminum hydroxide as described in JP-A 61-239581, magnesium hydroxide as described in JP-A 5-74603, as well as halogen-containing organic compounds (including polymers) such as 2,2-bis(4-hydroxy-3,5-dibromophenyl)-propane and polyvinylidene fluoride (PVDF) and phosphorus compounds such as ammonium phosphate.

In addition to these additives, the thermistor of the invention may contain zinc sulfide, basic magnesium carbonate, aluminum oxide, calcium silicate, magnesium silicate, aluminosilicate clay (mica, talc, kaolinite, montmorillonite, etc.), glass powder, glass flakes, glass fibers, calcium sulfate, etc.

The above additives should preferably be used in an amount of up to 25% by weight based on the total weight of the polymer matrix, low-molecular organic compound and conductive particles.

The organic PTC thermistor according to the invention has a low initial resistance in its non-operating state, typically a room-temperature resistivity of about $10^{-3}$ to $10^{-1}$ $\Omega$-cm, and experiences a sharp resistance rise during operation so that the rate of resistance change upon transition from its non-operating state to operating state may be 6 orders of magnitude or greater.

Referring to FIG. 1, there is illustrated an organic PTC thermistor according to one embodiment of the invention. The organic PTC thermistor includes a thermistor body 2 sandwiched between a pair of electrodes 3, the thermistor body 2 comprising at least a thermoplastic polymer matrix and conductive metal particles. The illustrated embodiment illustrates one exemplary cross-sectional shape of the thermistor, and various modifications may be made without departing from the scope of the invention. The planar shape of the thermistor may be a circular, square, rectangular or any other shape depending on the desired characteristics and specifications.

EXAMPLE

Examples of the invention are given below by way of illustration and not by way of limitation.

Example 1

The conductive metal particles used were filamentary nickel powder (trade name INCO Type 210 Nickel Powder by INCO Ltd.) having an average particle diameter of 0.5–1.0 $\mu$m, an apparent density of 0.8 g/cm$^3$, and a specific surface area of 1.5–2.5 m$^2$/g.

Figure 2:
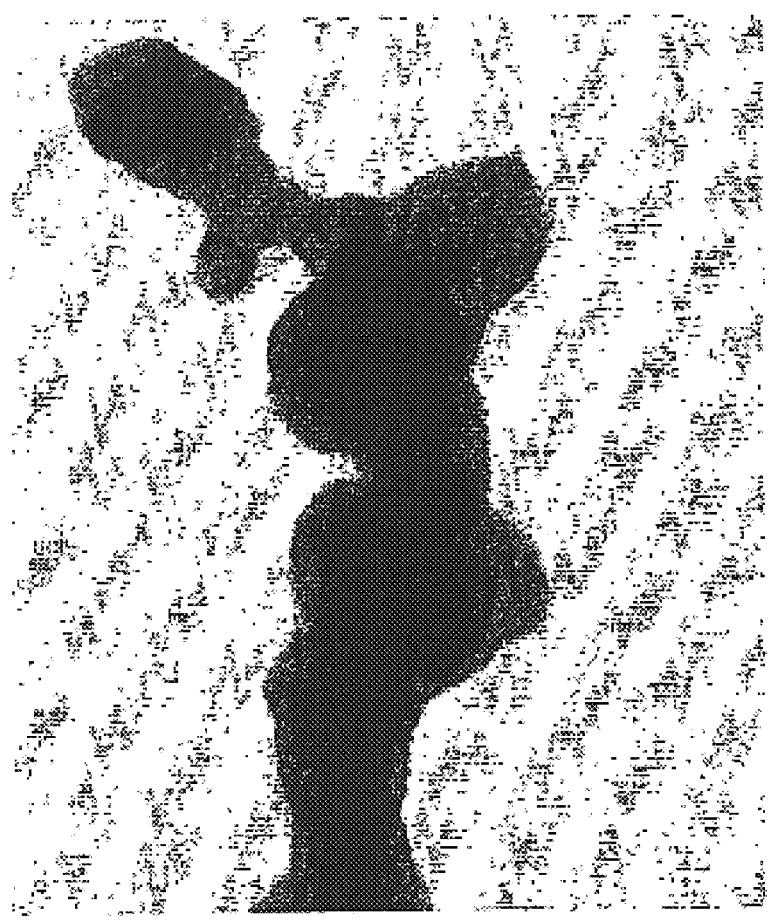
FIG. 2 is a TEM photomicrograph showing the state of nickel particles prior to treatment with organic material according to the Example.
Figure 3:
FIG. 3 is a TEM photomicrograph showing the state of nickel particles treated with organic material according to the Example.

The nickel powder was dispersed in a 0.25% ethanol solution of polyethylene glycol (molecular weight 200, by Junsei Chemical Co., Ltd.), the amount of polyethylene glycol being 0.5% by weight based on the nickel powder, and agitated to form a slurry. Ethanol was evaporated off by means of an evaporator, leaving the surface treated nickel powder which was dried in vacuum. FIGS. 2 and 3 are TEM photomicrographs of the nickel powder before and after treatment.

A linear low-density polyethylene (trade name Evolue 2520 by Mitsui Chemicals, Inc., MFR 1.7 g/10 min, mp 121° C.) as the organic polymer matrix, the surface treated filamentary nickel powder, and paraffin wax (trade name Poly Wax 655 by Baker Petrolite, mp 99° C.) as the operating material were used in a volume ratio of 44:26:30. They were admitted into a mill set at 150° C. and milled for 30 minutes.

The milled mixture was sandwiched between Ni foil electrodes. Using a heat press, the assembly was heat pressed at 150° C. to a total thickness of 0.35 mm. The electrode-bearing sheet on both surfaces was exposed to electron beams of 20 Mrad for crosslinking. The sheet was punched out into a disk having a diameter of 10 mm, obtaining a thermistor device.

Example 2

A thermistor device was manufactured as in Example 1 except that polyglycerin (trade name Unigly G-2 by NOF Corp.) was used instead of the polyethylene glycol.

Example 3

A thermistor device was manufactured as in Example 1 except that tetradecanol (trade name NAA-43 by NOF Corp., mp 38° C.) was used instead of the polyethylene glycol.

Example 4

A thermistor device was manufactured as in Example 1 except that erucic acid amide (trade name Neutron S by Nippon Seika Co., Ltd., mp 78° C.) was used instead of the polyethylene glycol.

Example 5

A nickel powder was surface treated as in Example 1. The nickel powder used was a filamentary nickel powder (trade name INCO Type 255 Nickel Powder by INCO Ltd.) having an average particle diameter of 2.2–2.8 $\mu$m, an apparent density of 0.5–0.65 g/cm$^3$, and a specific surface area of 0.68 m$^2$/g.

Using a centrifugal dispersing machine, 20 g of a bisphenol A type epoxy resin (trade name Epikote 801 by Yuka Shell Epoxy Co., Ltd.), 10 g of a modified amine curing agent (trade name Epomate B002 by Yuka Shell Epoxy Co., Ltd.), 15 g of paraffin wax (trade name Poly Wax 655 by Baker Petrolite, mp 99° C.), 180 g of the surface treated nickel powder, and 20 ml of toluene were mixed for 20 minutes. The kneaded slurry was coated to one surface of a Ni foil, and another Ni foil was rested on the coated surface. The assembly was sandwiched between brass plates, with spacers of 0.4 mm thick. Using a heat press set at 90° C., the assembly was held under pressure for 3 hours for curing. The electrode-bearing sheet of 0.4 mm thick was punched out as in Example 1, obtaining a thermistor device. Five thermistor samples Nos. 1 to 5 were prepared, and they showed a resistance prior to a thermal shock test of 0.006 Ω, 0.006 Ω, 0.006 Ω, 0.007 Ω, and 0.007 Ω for Nos. 1 to 5, respectively.

The results suggest that metal particles are restrained from agglomerating and the variation among samples is minimized.

Comparative Example 1

A thermistor device was manufactured as in Example 1 except that the nickel powder was not surface treated.

Comparative Example 2

A thermistor device was manufactured as in Example 1 except that the previous surface treatment of nickel powder in Example 1 was omitted, and instead, polyethylene glycol was mixed at the same time as heat mixing of polyethylene, paraffin wax and nickel powder.

Comparative Example 3

A thermistor device was manufactured as in Example 5 except that the nickel powder was not surface treated. Five thermistor samples Nos. 31 to 35 were prepared, and they showed a resistance prior to a thermal shock test of 0.005 Ω, 0.008 Ω, 0.011 Ω, 0.012 Ω, and 0.015 Ω for Nos. 31 to 35, respectively.

The results suggest that the resistance substantially varies among samples on account of agglomeration of metal particles.

Comparative Example 4

In a 1:1 water/ethanol mixture was dissolved 0.5% by weight of a silane coupling agent (vinyltriethoxysilane, trade name KBE 1003 by Shin-Etsu Chemical Co., Ltd.). To the solution was added 1% by weight of acetic acid (99.7%). The nickel powder used in Example 1 was added to the solution, which was agitated for 5 hours. The mixture was filtered through a paper filter. The nickel powder on the paper filter was washed with ethanol and dried for one day at 60° C.

Using the nickel powder treated with the coupling agent, a thermistor device was manufactured otherwise as in Example 1.

A thermal shock test was carried out on the device samples of the foregoing Examples and Comparative Examples. The test consisted of 200 cycles of alternately holding at −40° C. for 30 minutes and at 85° C. for 30 minutes. The results are shown below.

TABLE 1

| Sample | Thermal shock test | |
| --- | --- | --- |
|  | Resistance before test (Ω) | Resistance after test (Ω) |
| EX 1 | 0.001 | 0.014 |
| EX 2 | 0.002 | 0.020 |
| EX 3 | 0.001 | 0.028 |
| EX 4 | 0.001 | 0.022 |
| EX 5 | 0.006 | 0.032 |
| CE 1 | 0.001 | 0.252 |
| CE 2 | 0.002 | 0.107 |
| CE 3 | 0.005 | 0.298 |
| CE 4 | 0.002 | 135 |

It is evident that Examples 1 to 4 having undergone surface treatment are advantageous over Comparative Example 1 without surface treatment. Examples 1 to 4 having undergone surface treatment are more advantageous than Comparative Example 2 relying on mere mixing instead of previous surface treatment of conductive powder. The use of a thermosetting epoxy resin as the organic polymer matrix also achieves significant surface treatment effects (see Example 5 vs. Comparative Example 3). The coverage of metal particle surfaces with an organic material prevents excessive agglomeration of conductive metal particles and improves dispersion thereof, contributing to the stabilization of initial resistance. The use of a coupling agent which can firmly bond with the polymer matrix and metal surface (Comparative Example 4) detracts from the desired characteristics, even when compared with the untreated control.

The present invention is successful in improving the performance stability of organic PTC thermistors containing metal as conductive particles.

What is claimed is:

1. An organic positive temperature coefficient thermistor, comprising an organic polymer matrix and conductive metal particles dispersed therein, wherein a layer of organic material is disposed on a surface of the conductive metal particles, and wherein the organic material is different from the organic polymer matrix, does not covalently bond with the conductive metal particles, and is not compatible at a molecular level with the organic polymer matrix, and wherein the organic material is a solid or liquid at room temperature, and nonvolatile at room temperature, as indicated by a vapor pressure of less than about 0.1 mm Hg at room temperature.

2. The organic positive temperature coefficient thermistor of claim 1, wherein said organic material is not reactive with the organic polymer matrix.

3. The organic positive temperature coefficient thermistor of claim 1, wherein said conductive metal particles comprise nickel or copper.

4. The organic positive temperature coefficient thermistor of claim 1, wherein said organic polymer matrix comprises a thermoplastic polymer.

5. The organic positive temperature coefficient thermistor of claim 1, further comprising a low-molecular weight organic compound.

6. The organic positive temperature coefficient thermistor of claim 1, wherein said conductive metal particles have spiky protuberances.

7. The organic positive temperature coefficient thermistor of claim 1, wherein said organic material is biodegradable.

8. A method for preparing an organic positive temperature coefficient thermistor, comprising the steps of:

pretreating conductive metal particles with an organic material so that the organic material covers surfaces of the conductive metal particles, and mixing the treated conductive metal particles with an organic polymer matrix for dispersion, and wherein the organic material is a solid or liquid at room temperature, and nonvolatile at room temperature, as indicated by a vapor pressure of less than about 0.1 mm Hg at room temperature.

9. The method of claim 8, wherein said organic material is different from the organic polymer matrix, does not covalently bond with the conductive metal particles, and is not compatible at a molecular level with the organic polymer matrix.

10. The method of claim 8, wherein said organic material is not reactive with the organic polymer matrix.

11. The method of claim 8, wherein said conductive metal particles comprise nickel or copper.

12. The method of claim 8, wherein said organic polymer matrix comprises a thermoplastic polymer.

13. The method of claim 8, wherein said organic polymer matrix further comprises a low-molecular weight organic compound.

14. The method of claim 8, wherein said conductive metal particles have spiky protuberances.

15. The method of claim 8, wherein said organic material is biodegradable.

* * * * *